July 23, 1957
G. F. TAGG
2,800,629
EARTH RESISTANCE MEASURING EQUIPMENT
Filed Feb. 13, 1956
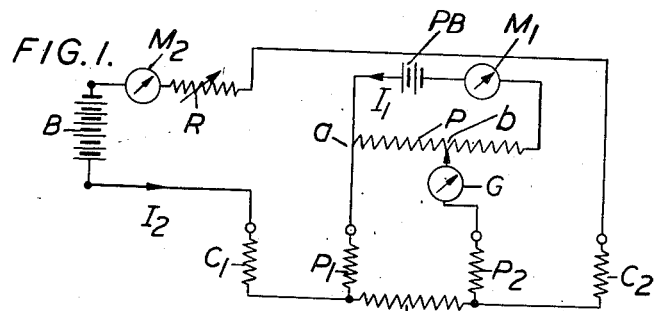
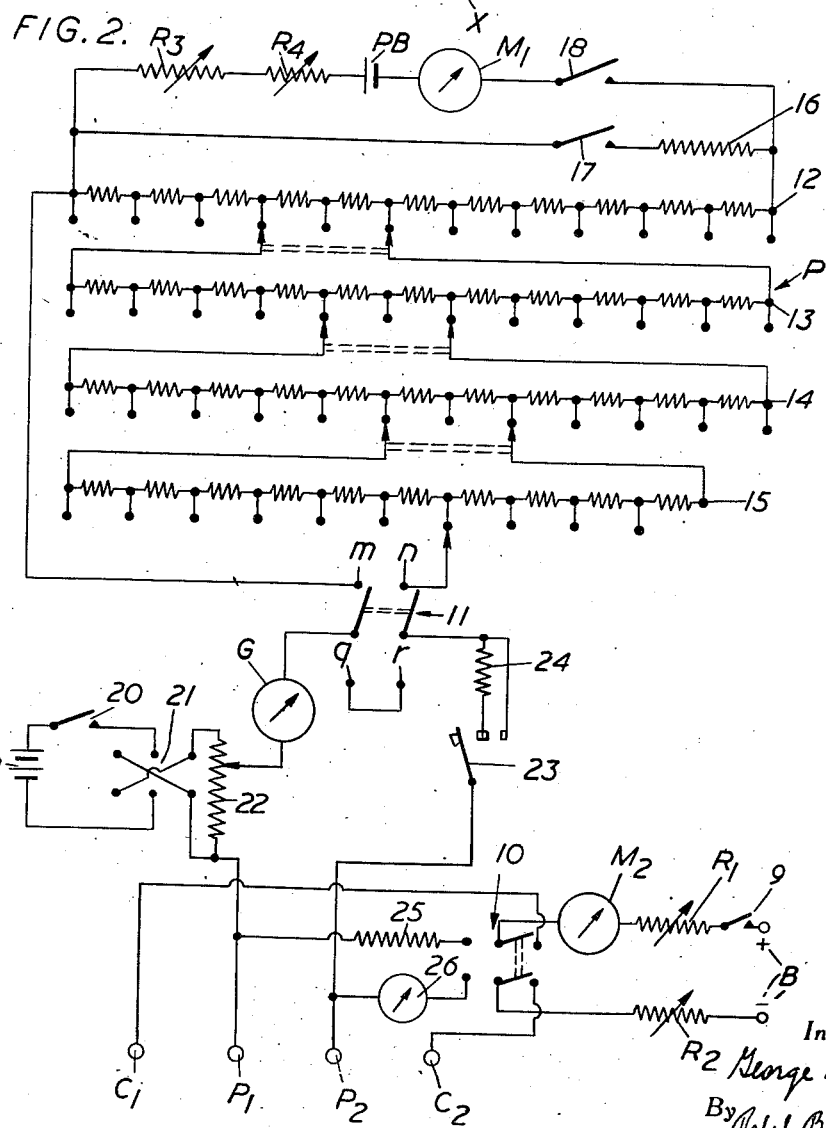
Inventor
George F. Tagg
By Ralph B. Stewart
Attorney

United States Patent Office

2,800,629
Patented July 23, 1957

2,800,629

EARTH RESISTANCE MEASURING EQUIPMENT

George Frank Tagg, Chiswick, London, England, assignor to Evershed & Vignoles Limited Application February 13, 1956, Serial No. 565,185

Claims priority, application Great Britain February 16, 1955

5 Claims. (Cl. 324—62)

In the measurement of earth resistance a test current is caused to flow through an earth circuit, which includes the portion to be tested, by means of two current electrodes inserted in the earth. The potential drop across any particular portion of the circuit may then be tapped off by a pair of additional potential electrodes. In principle it is then a straightforward matter to calculate the resistance of the portion of the circuit under test from a knowledge of the current flowing and the potential drop produced. In practice, however, these two values are normally employed to energise a crossed coil instrument so as to provide a direct reading of the resistance. Such instruments, however, have limitations in their use, and when the resistance to be measured is very low, it becomes very difficult to provide a sufficiently sensitive instrument.

Again in principle it is possible to measure the potential drop with any required degree of accuracy by means of a potentiometer, but this involves a knowledge of the voltage of the standard source employed, and also, of course, has the disadvantage of not providing a direct reading. When using a potentiometer for this purpose, under balance conditions the product of the current flowing in the potentiometer resistance and the value of that resistance up to the balance point is equal to the product of the current flowing in the earth circuit and the resistance of that circuit. In other words, the two resistances are in inverse ratio of the two currents, and this fact is utilised as the basis of the present invention.

Thus according to the invention, an adjusting resistance or resistances is or are provided whereby the current supplied to the earth circuit and to the potentiometer circuit may be caused to bear a predetermined ratio and the potentiometer is calibrated directly in terms of the resistance of the portion of the earth circuit under test. Thus if, for example, the current in the earth circuit is a thousand times as great as that in the potentiometer circuit and the value of the potentiometer resistance is 1,000 ohms, then the instrument is capable of measuring an earth resistance up to a value of 1 ohm.

The invention will be described by reference to the accompanying drawing in which Figure 1 is a schematic diagram showing the circuits involved, and Figure 2 is a more detailed circuit diagram of a specific embodiment of the invention.

Current is supplied to the earth circuit by means of a battery B and current electrodes C1 and C2 which are inserted in the earth, and which each has a resistance as indicated in the drawing. The portion of the earth circuit which is to be tested is isolated by means of a pair of potential electrodes P1 and P2, the resistance X of the portion of the circuit between them being the quantity which is to be measured by the instrument. The voltage tapped from the potential electrodes P1 and P2 is measured by means of a potentiometer resistance P supplied by a battery PB. The potentiometer is adjusted in the normal way until zero current is shown by a galvanometer G.

Under conditions of balance as indicated by a position $b$ of the potentiometer slider, the resistance drop between the point $a$ at the left-hand end of the potentiometer resistance and the point $b$, that is to say, the current flowing from the potentiometer battery PB multiplied by the resistance of the potentiometer wire $a-b$ is equal to the current flowing from the battery B multiplied by the resistance to be determined X. These two currents are indicated respectively by meters M1 and M2, and if the values of the currents flowing in the two circuits are respectively $I_1$ and $I_2$, then $$I_1 \times \text{resistance } ab = I_2 \times X$$

and consequently $$X = \text{resistance } ab \times \frac{I_1}{I_2}$$

In other words the resistance of the earth circuit which is to be determined is equal to the value of the potentiometer resistance up to the balance point, which can be measured directly, multiplied by the ratio of the two currents. Consequently provided the ratio of the two currents is adjusted to a predetermined value, the potentiometer can be calibrated directly in terms of resistance. In order to adjust the two meters M1 and M2 so that their readings bear the required ratio, an adjusting resistance R is provided in the circuit of the battery B, and if desired a further resistance can also be included in the circuit of the potentiometer battery PB. Since it is only required to measure the ratio of the currents in the two circuits, the meters M1 and M2 need not necessarily be calibrated directly in terms of current, but may be provided with an arbitrary scale.

One of the errors which is normally experienced in earth resistance measurement arises from the presence of stray voltages produced either by electrolysis effects or by the presence of stray currents in the earth. This difficulty is normally overcome by means of periodical rapid reversal of the test current by means of a mechanical interruptor driven from the hand-operated generator. In an arrangement in accordance with the present invention, however, the test current required may be too large to be derived conveniently from a hand-operated generator, and as shown in Figure 1 an independent source of direct current in the form of the battery B is provided. Since this battery current cannot conveniently be reversed, an alternative method of eliminating stray fields is required.

For this purpose an additional source of direct current voltage (not shown in Figure 1) may be provided whereby a voltage may be superimposed on the potential drop across the portion of the earth circuit under test so as to compensate for the effect of any extraneous direct current voltage picked up from the earth. In operation, therefore, a preliminary reading is taken with the potentiometer but without the main test current flowing. In general the potentiometer circuit will indicate a small potential difference across the potential electrodes and this is then counteracted by the injection into the circuit of a compensating voltage from the additional source of direct current. Thus when the test current is caused to flow, the injected voltage superimposed on the potential drop across the portion of the earth circuit under test will counteract the effects of any extraneous voltages picked up from the earth, and the reading of the potentiometer will give the true value of the earth resistance.

Equipment in accordance with the invention will now be described in more detail by way of example with reference to Figure 2 of the accompanying drawings, which is a circuit diagram and on which parts common to both Figures 1 and 2 are indicated by the same references.

Current from the main battery B is supplied to the current electrodes C1 and C2 by way of a changeover switch 10. The circuit also includes a meter M2, a coarse adjusting resistance R1 and a fine adjusting resistance R2 and a switch 9. The potential drop across the portion of the earth circuit under test is picked up by the potential electrodes P1 and P2. The potential across the electrodes P1 and P2 passes via a galvanometer G and a changeover switch 11 to a vernier potentiometer indicated generally as P. The theory and connection of this type of potentiometer is well known. In a particular example this includes eleven coils 12, each of 100 ohms resistance, eleven coils 13, each of 20 ohms resistance, eleven coils 14, each of 4 ohms resistance and ten coils 15, each of 0.8 ohm resistance. In addition the potentiometer is shunted by a resistance 16 connected in series with a switch 17, the resistance 16 in the example just quoted having a resistance of 111.11 ohms so that by closing the switch 11, the reading obtained is divided by ten.

The potentiometer P is supplied from a battery PB in series with a meter M1, coarse and fine adjusting resistances R3 and R4 respectively and a switch 18. Expressed in its simplest terms, the operation is as follows. Firstly the adjusting resistances R1 and R2 and R3 and R4 are adjusted until the readings of the meters M1 and M2 show the required predetermined ratio; in the example just quoted this is a thousand to one. Consequently since the total resistance of the potentiometer is 1,000 ohms, the resistance X can be measured up to a value of one ohm. The voltage tapped from the potential electrodes P1 and P2 is balanced by adjustment of the potentiometer in the normal way and when the balance point has been reached as indicated by the galvanometer G, the resistance X is then read off directly from the setting of the dials of the potentiometer.

In order to compensate for the effects of extraneous voltages in the earth, a compensating source of direct current in the form of a battery CB is provided, which is connected through a single pole switch 20 and a reversing switch 21 to a potentiometer resistance 22. Before starting the test, the changeover switch 11 is switched from the potentiometer terminals $m$ and $n$ to alternative terminals $q$ and $r$, whereby the galvanometer G is connected in series with the voltage across the potential electrodes P1 and P2 and that across the potentiometer resistance 22. By depressing a switch 23 the galvanometer is first connected in series with a resistance 24, while further pressure on the switch 23 short-circuits the resistance 24 to give the final reading. The slider of the potentiometer 22 is adjusted until the voltage injected from the compensating source exactly balances the voltage picked up from the potential electrodes P1 and P2, which, of course, represents only the stray voltage since no current is flowing from the main battery B. Depending on the direction of this stray voltage so the reversing switch 21 may require to be operated to give the injected voltage the right polarity.

Once the injected voltage has been adjusted to the required value, the operation can proceed and the changeover switch 11 is moved back to the terminals $m$ and $n$ of the potentiometer. At the same time the main battery current is caused to flow by closing the switch 9. Since the stray voltage is now balanced by the injected voltage which remains in circuit, the reading of the potentiometer P gives a true value of the earth resistance X.

Earth resistance measurements are often carried out over relatively long distances so that one operator may be required for the instrument itself, while another inserts the potential electrodes P1 and P2 in the required position. Since these two operators may be out of sight of one another, it is convenient for the operator in charge of the instrument to know when the potential electrodes are inserted in position ready for the taking of a reading. It is for this purpose that the changeover switch 10 is provided.

In its right-hand position it serves to connect the supply from the battery to the current electrodes C1 and C2 as previously described. In its left-hand position, however, the supply from the battery B is diverted to the potential electrodes P1 and P2, the circuit also including a limiting resistance 25 and an indicator 26. Unless the potential electrodes are in position in the ground, no reading will be given by the indicator 26. Provided, however, a reading is obtained from the instrument, the operator in charge of the instrument knows when the potential electrodes are in position ready for the test and he may then proceed as previously described.

I claim:

1. Earth resistance measuring equipment comprising a pair of current electrodes for insertion in the earth, a first source for supplying direct current to said current electrodes, a pair of potential electrodes for insertion in the earth between said current electrodes, potentiometer means for measuring the potential between said potential electrodes, a second source for supplying direct current to said potentiometer means, means for indicating the ratio between the currents from said first and second sources, and means for adjusting said ratio, said potentiometer means being calibrated to read directly in terms of the earth resistance between said potential electrodes.

2. Equipment according to claim 1, in which an adjusting resistance and an ammeter are provided in both the earth circuit and the potentiometer supply circuit.

3. Equipment according to claim 1 and including an additional source of direct current connected to provide a voltage superimposed on the potential drop across the portion of the earth circuit under test so as to compensate for the effect of any extraneous direct current voltage picked up from the earth.

4. Equipment according to claim 3, and including a changeover switch normally connecting a galvanometer for detecting balance conditions of the potentiometer and alternatively connecting said galvanometer in series with the compensating voltage and the portion of the earth circuit under test, so that in the absence of any test current in the earth circuit the compensating voltage may be adjusted to balance the extraneous direct current voltage picked up from the earth.

5. Equipment according to claim 1, and including a change-over switch for connecting said first source of current directly to electrodes used for picking up the potential drop across the portion of the earth circuit under test, the circuit to these electrodes from the switch also including a series resistance and an indicator.

References Cited in the file of this patent

UNITED STATES PATENTS

| | | |
|---|---|---|
| 2,648,820 | Miller | Aug. 11, 1953 |
| 2,659,861 | Branson | Nov. 17, 1953 |